(12) United States Patent
Abrams et al.

(10) Patent No.: US 11,414,001 B1
(45) Date of Patent: Aug. 16, 2022

(54) MOTORIZED VEHICLES FOR TRANSPORTING MATERIAL, AND METHODS RELATING THERETO

(71) Applicant: LHD Machinery LLC, Cicero, IN (US)

(72) Inventors: Tony Abrams, Cicero, IN (US); Jeff Zurawski, Noblesville, IN (US); Kevin Stutey, Carmel, IN (US)

(73) Assignee: LHD Machinery LLC, Cicero, IN (US)

( * ) Notice: Subject to any disclaimer, the term of this patent is extended or adjusted under 35 U.S.C. 154(b) by 0 days.

(21) Appl. No.: 17/213,059

(22) Filed: Mar. 25, 2021

(51) Int. Cl.
*B60P 1/30* (2006.01)
*B60P 1/28* (2006.01)

(52) U.S. Cl.
CPC .. *B60P 1/30* (2013.01); *B60P 1/28* (2013.01)

(58) Field of Classification Search
CPC .................................. B60P 1/30; B60P 1/28
USPC ...... 298/17.7, 22 r, 22 c, 22 f, 22, 21 r, 21 v, 298/19 v; 56/14.7, 14.9, 15.4, 16.7; 180/212, 242, 247, 305
See application file for complete search history.

(56) References Cited

U.S. PATENT DOCUMENTS

| | | | | |
|---|---|---|---|---|
| 2,657,408 A | * | 11/1953 | Machovec | E01H 1/045 15/83 |
| 6,322,151 B2 | | 11/2001 | Dombek et al. | |
| 6,619,754 B1 | * | 9/2003 | Dombek | E02F 9/2004 298/7 |
| 6,955,404 B1 | * | 10/2005 | Best | B62B 3/08 298/220 |
| 6,997,667 B2 | * | 2/2006 | Hackett | E02F 3/3486 414/501 |
| 8,561,382 B2 | * | 10/2013 | Gamble | A01D 34/64 56/14.7 |

OTHER PUBLICATIONS

LHP Machinery Product Catalog, Copyright 2017 (18 pages).
Purple Wave, Wacker WB16 power buggy for sale, YouTube Video, Feb. 17, 2016, https://www.youtube.com/watch?v=8RRnlfKTKhM (4 pages).
Patrick Guerrette, buggy 058.3gp, YouTube Video, Jan. 6, 2012, https://www.youtube.com/watch?v-CZq3_53b-9s (4 pages).

* cited by examiner

*Primary Examiner* — D Glenn Dayoan
*Assistant Examiner* — Sunsurraye Westbrook
(74) *Attorney, Agent, or Firm* — Harness, Dickey & Pierce, P.L.C.

(57) ABSTRACT

A motorized vehicle is provided for transporting material and selectively dumping the material from the vehicle. In one example, the motorized vehicle includes a frame, first and second forward wheel assemblies coupled to the frame, and a rearward wheel assembly coupled to the frame. An engine is supported by the frame and configured to rotate the first and second forward wheel assemblies to move the motorized vehicle. The motorized vehicle also includes a bucket supported by the frame adjacent the first and second forward wheel assemblies. The bucket is configured to rotate about a vertical axis between a first radial positon in which a longitudinal axis of the bucket is generally parallel with the longitudinal axis of the frame and a second radial positon in which the longitude axis of the bucket is oriented generally perpendicular to the longitudinal axis of the frame.

18 Claims, 10 Drawing Sheets

MOTORIZED VEHICLES FOR TRANSPORTING MATERIAL, AND METHODS RELATING THERETO

FIELD

The present disclosure is generally directed to motorized vehicles for transporting material and methods related thereto and, more particularly, to motorized wheeled vehicles (e.g., power buggies, etc.) having side dump capabilities and methods of using such vehicles.

BACKGROUND

This section provides background information related to the present disclosure which is not necessarily prior art.

Power buggies are often used to haul material from one location to another, for example, at construction sites, etc. The buggies can generally handle loads of material ranging from a few hundred pounds up to a few tons. In addition, the buggies are generally sized to operate in smaller areas than conventional dump trucks or concrete trucks, for example, along narrow paths, between doorways, within structures, etc. In connection therewith, the buggies typically include buckets for holding the material being hauled, and for subsequently dumping the material directly in front of the buggies. Operators walk behind the buggies, or stand on platforms or sit on seats mounted on rearward portions of the buggies to control the hauling movements and dumping actions.

SUMMARY

This section provides a general summary of the disclosure, and is not a comprehensive disclosure of its full scope or all of its features.

Example embodiments of the present disclosure are generally directed to motorized vehicles for transporting material. In one example embodiment, such a motorized vehicle generally includes a frame having a longitudinal axis, and first and second forward wheel assemblies. The first forward wheel assembly includes at least one tire disposed toward a first side of the frame, and the second forward wheel assembly includes at least one tire disposed toward a second side of the frame. The at least one tire of the first forward wheel assembly is spaced apart from the at least one tire of the second forward wheel assembly along a forward axis, and the forward axis is disposed generally perpendicular to the longitudinal axis of the frame. The motorized vehicle also includes a rearward wheel assembly including a first tire disposed toward the first side portion of the frame and a second tire disposed toward the second side portion of the frame, where the first tire of the rearward wheel assembly is spaced apart from the second tire of the rearward wheel assembly along a rearward axis and where the rearward axis is disposed generally perpendicular to the longitudinal axis of the frame. The motorized vehicle further includes an engine supported by the frame and configured to rotate the at least one tire of the first forward wheel assembly and the at least one tire of the second forward wheel assembly to thereby move the motorized vehicle, and a bucket assembly supported by the frame and configured to hold material on the motorized vehicle and selectively dump the material from the motorized vehicle. The bucket assembly is disposed adjacent the first and second forward wheel assemblies. The bucket assembly includes a bucket configured to pivot about a horizontal axis of the bucket assembly to dump the material from the motorized vehicle, and a platform configured to rotate about a vertical axis of the bucket assembly to move the bucket in a radial direction relative to the frame.

In another example embodiment, such a motorized vehicle generally includes a frame having a longitudinal axis, first and second forward wheel assemblies coupled to the frame, and a rearward wheel assembly coupled to the frame. The first forward wheel assembly is disposed toward a first side of the frame and the second forward wheel assembly is disposed toward a second side of the frame. The motorized vehicle also includes an engine supported by the frame and configured to rotate the first and second forward wheel assemblies to thereby move the motorized vehicle, and a bucket supported by the frame adjacent the first and second forward wheel assemblies. The bucket is configured to hold material on the motorized vehicle and selectively dump the material from the motorized vehicle. The bucket is configured to rotate about a vertical axis at least between a first radial positon in which a longitudinal axis of the bucket is generally parallel with the longitudinal axis of the frame and a second radial positon in which the longitude axis of the bucket is oriented generally perpendicular to the longitudinal axis of the frame.

Example embodiments of the present disclosure are also generally directed to methods of using motorized vehicles to transport material between locations and to dump the material at one or more of the locations. In one example embodiment, such a method generally includes actuating, by an engine of the motorized vehicle, first and second forward wheel assemblies to move the motorized vehicle, via tires of the first and second forward wheel assemblies, from a first location to a second location. The method then includes, at the second location, rotating, by a first actuator powered by the engine, a bucket of the motorized vehicle in a radial direction of a frame of the motorized vehicle from a first radial positon, in which a longitudinal axis of the bucket is generally parallel with a longitudinal axis of the frame of the motorized vehicle, to a second radial positon, in which the longitude axis of the bucket is oriented perpendicular to the longitudinal axis of the frame; and pivoting, by a second actuator powered by the engine, the bucket about a mount extending along a wall of the bucket to dump the material from the motorized vehicle toward a side of the motorized vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

FIGS. 1-18 illustrate an example embodiment of a vehicle 100 including one or more aspects of the present disclosure. The vehicle 100 is configured (e.g., is constructed and operable, etc.) to haul material between locations (e.g., at construction sites, etc.) and to selectively dump the material, as desired. Uniquely herein, the vehicle 100 is configured to not only dump material directly in front of the vehicle 100, but to also, as desired, dump material to any angle on either lateral side of the vehicle 100 (e.g., to a left or right side of the vehicle 100, etc.) (e.g., such that the vehicle 100 has side-dump capabilities, etc.). That said, any suitable material may be hauled (and selectively dumped) by the vehicle 100 within the scope of the present disclosure including, for example, aggregate, concrete, dirt/soil, etc.

Figure 1:
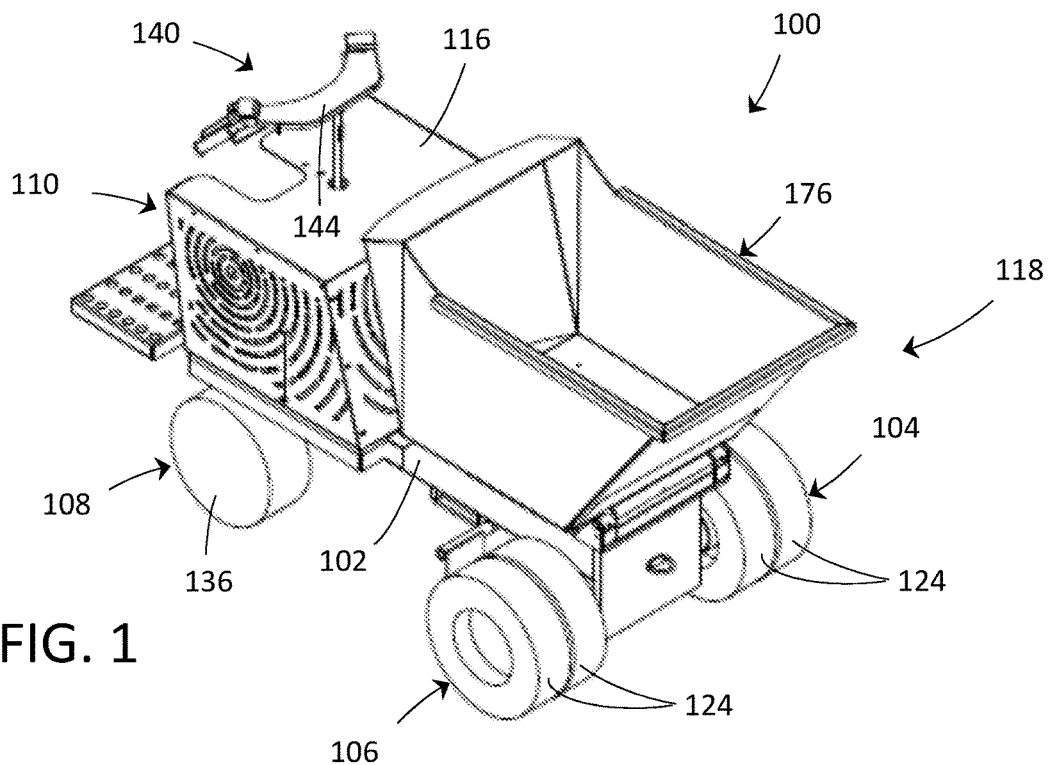
FIG. 1 is an isometric view of a motorized vehicle including one or more aspects of the present disclosure, with a bucket of the motorized vehicle shown in a hauling position.
Figure 2:
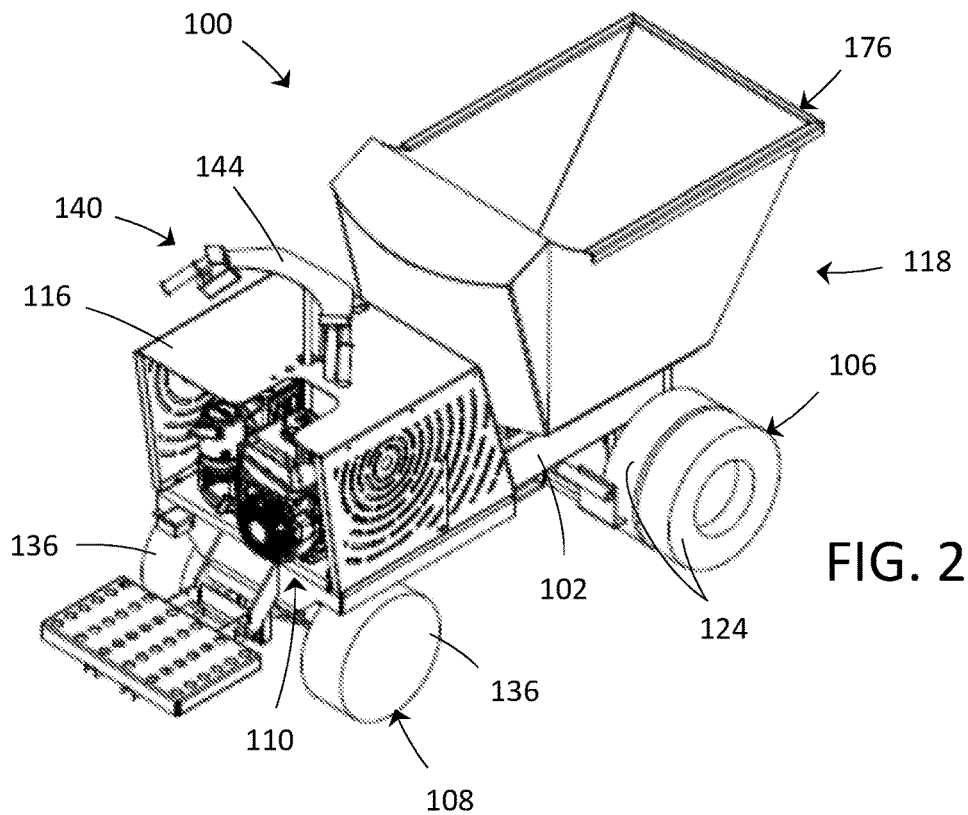
FIG. 2 is another isometric view of the motorized vehicle of FIG. 1.
Figure 3:
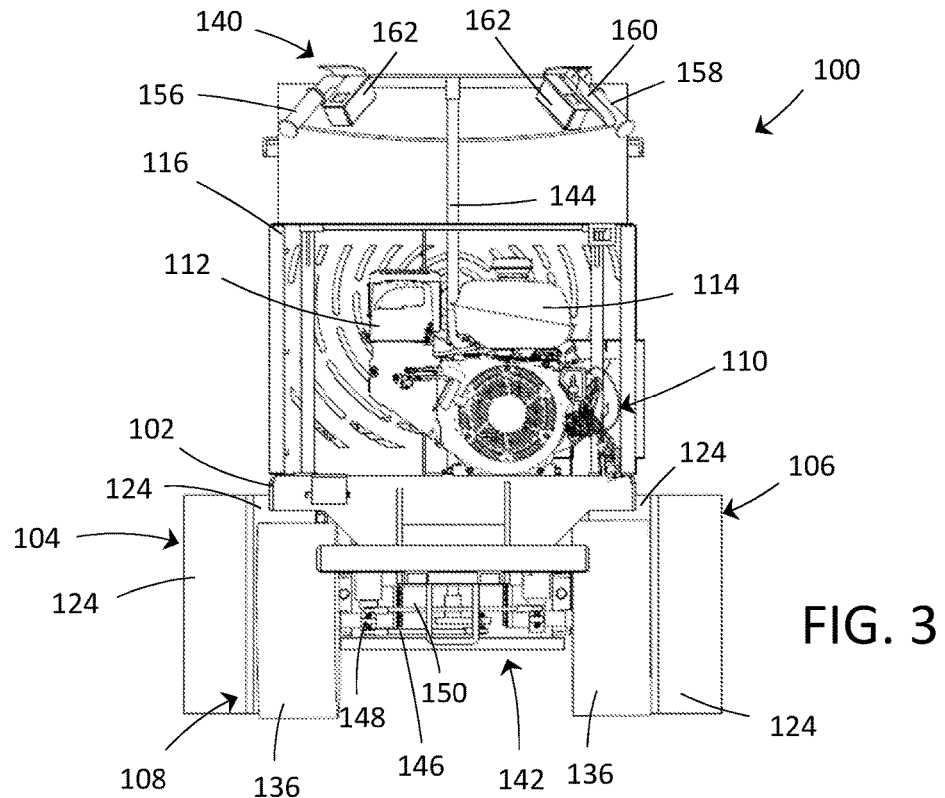
FIG. 3 is a rear elevation view of the motorized vehicle of FIG. 1.

As shown in FIGS. 1-3, the vehicle 100 includes a frame 102 (or chassis) supporting the vehicle 100 (e.g., supporting the various parts and/or components of the vehicle 100, etc.), and two forward wheel assemblies 104, 106 and a rearward wheel assembly 108 coupled thereto. The wheel assemblies 104-108 position the frame 102 generally above a ground surface and facilitate movement of the vehicle 100, as desired, across the ground surface (e.g., where the ground surface may include dirt, grass, rock, asphalt, concrete, flooring of a building, etc.). That said, the frame 102 may be constructed from suitable material capable of supporting the various parts and/or components of the vehicle 100, including, for example, one or more metals, alloys, etc.

The vehicle 100 also includes an engine 110 mounted on the frame 102 generally between the forward wheel assemblies 104, 106 and the rearward wheel assembly 108, to provide power to the vehicle 100 to move the vehicle 100 and operate the various components and/or parts of the vehicle 100 (such that the vehicle 100 may be viewed as a motorized vehicle 100, etc.). An air filter 112 and fuel tank 114 (FIG. 3) are provided in communication with the engine 110. And, a cover 116 is provided over these components (e.g., the engine 110, the air filter 112, the fuel tank 114, etc.) to provide protection thereto (in the illustrated embodiment, a rear portion of the cover 116 is removed to allow for illustration of the engine 110). The engine 110 may include any suitable engine 110 within the scope of the present disclosure. For example, the engine 110 may include a four-stroke engine of about 10-15 horsepower. Or, the engine 110 may include a larger engine of about 20 horsepower or more. That said, it should be appreciated that, more generally, any suitable engine may be used with the vehicle 100.

Figure 4:
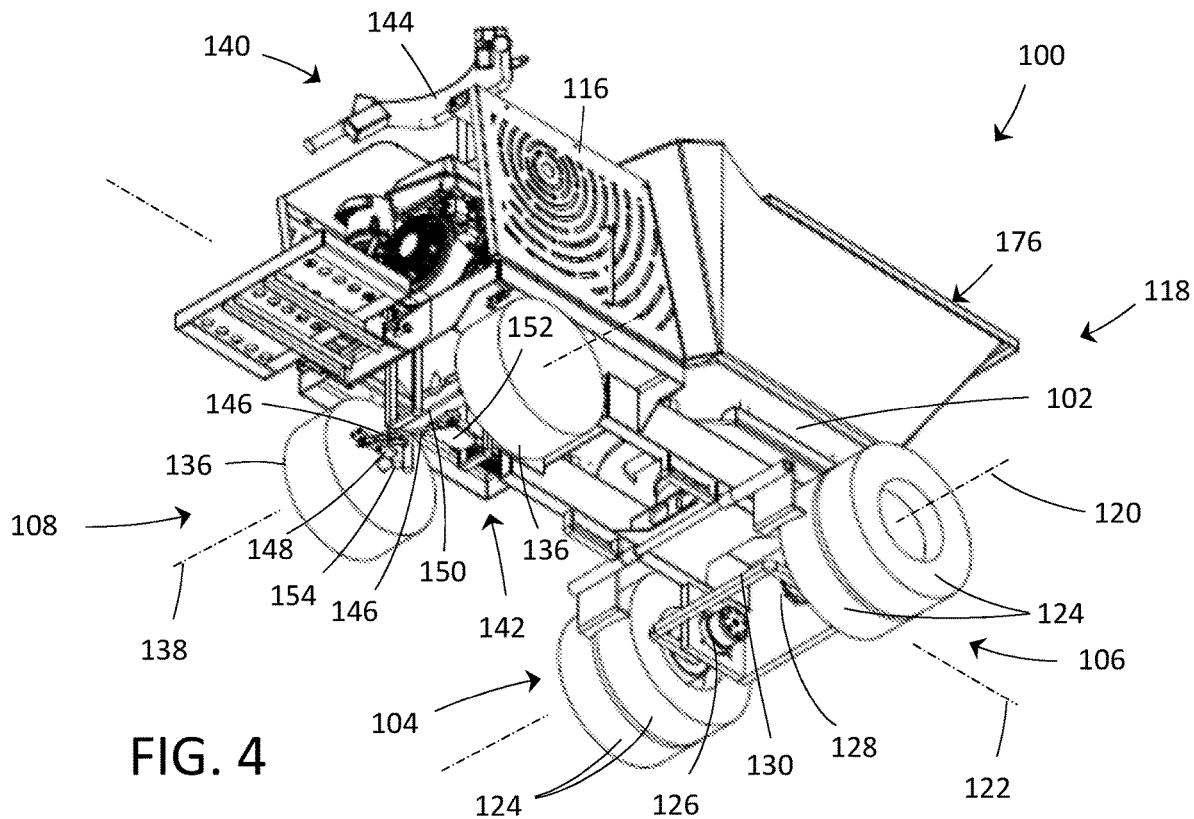
FIG. 4 is a bottom isometric view of the motorized vehicle of FIG. 1.

With additional reference to FIG. 4, the forward wheel assemblies 104, 106 of the vehicle 100 are located toward a forward end of the frame 102, adjacent a bucket assembly 118 of the vehicle 100, and include a first wheel assembly 104 and a second wheel assembly 106. The first and second forward wheel assemblies 104, 106 are spaced apart from each other, and are generally aligned along a forward axis 120 of the vehicle 100, where the forward axis 120 is then oriented generally perpendicular to a longitudinal axis 122 of the frame 102. In connection therewith, the first forward wheel assembly 104 is located toward a left side (or first side) of the frame 102 (as viewed in FIG. 3). And, the second forward wheel assembly 106 is located toward a right side (or second side) of the frame 102 (as viewed in FIG. 3).

In addition, each of the first and second forward wheel assemblies 104, 106 includes two tires (each indicated by reference number 124) located generally outside of (e.g., lateral of, etc.) the frame 102. The two tires 124 of each of the forward wheel assemblies 104, 106 are then positioned adjacent each other, and slightly separated (e.g., by a spacer, etc.). The tires 124 of each of the first and second forward wheel assemblies 104, 106 are further interconnected by (e.g., held together by, supported by, etc.) a respective axle 126, 128 (or hub unit). In particular, the tires 124 of the first forward wheel assembly 104 are interconnected by a first axle 126 (or hub unit) and the tires 124 of the second forward wheel assembly 106 are interconnected by a second axle 128 (or hub unit). The first and second axles 126, 128, in turn, are coupled to the frame 102 at a wheel mount 130 extending generally away from the frame 102 (e.g., by suitable bearings, etc.). And, the first and second axles 126, 128 are generally oriented in alignment with the forward axis 120 of the vehicle 100. The tires 124 of the first and second forward wheel assemblies 104, 106 may be operated (e.g., rotated, etc.), as described more below, to cause movement of the vehicle 100. That said, the tires 124 of the first and second forward wheel assemblies 104, 106 may include any suitable tires (e.g., rubber wheeled tires, etc.) within the scope of the present disclosure.

Figure 18:
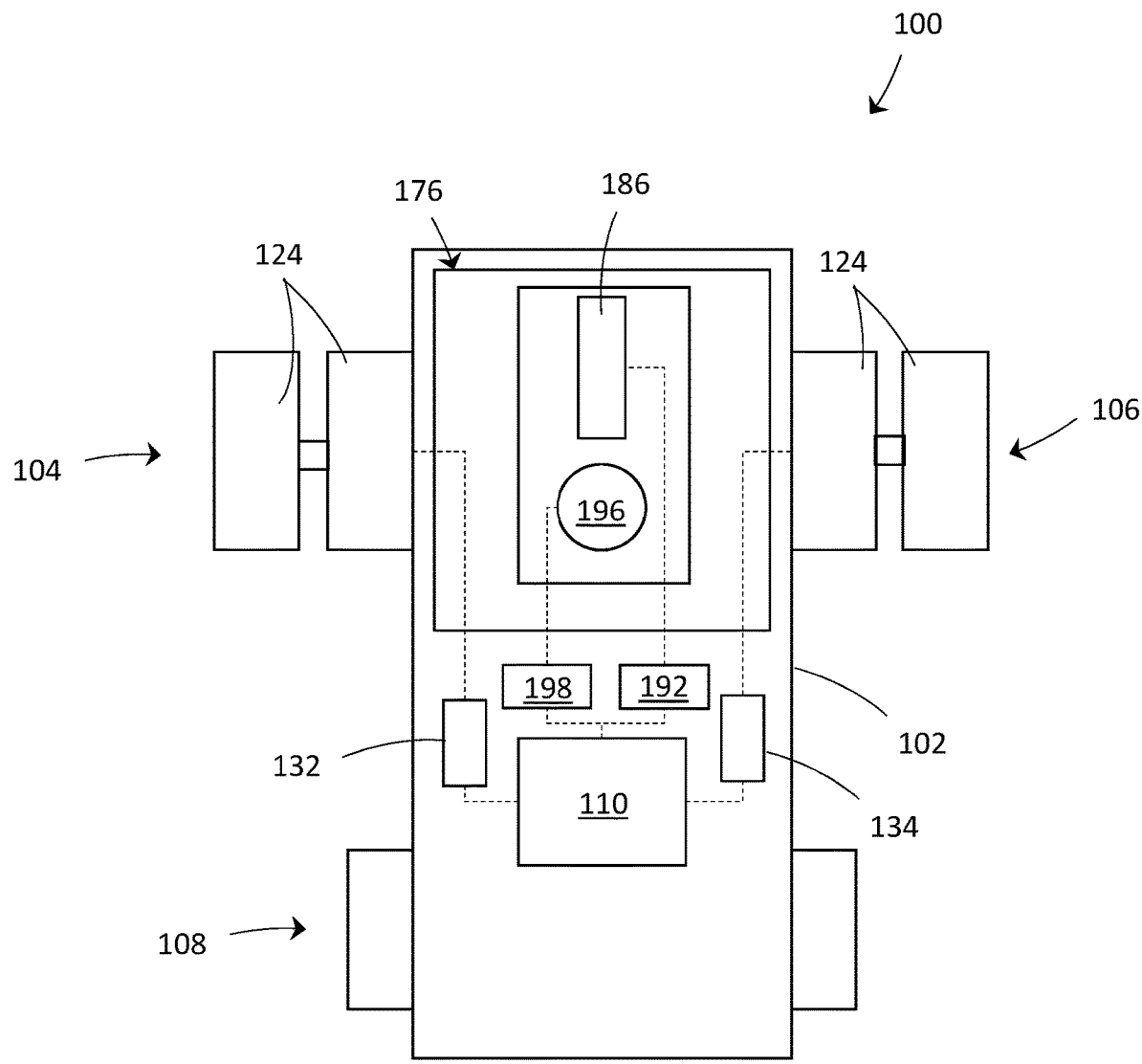
FIG. 18 is a schematic view of the motorized vehicle of FIG. 1, illustrating an engine of the motorized vehicle coupled to various components thereof.

The first and second forward wheel assemblies 104, 106 also each include a wheel motor 132, 134 configured to selectively rotate the tires 124 of the given assembly (see, e.g., FIG. 18). In particular, a first wheel motor 132 (e.g., a hydraulic motor, etc.) is coupled to the first axle 126, to selectively rotate the tires 124 of the first forward wheel assembly 104. And, a second wheel motor 134 (e.g., a hydraulic motor, etc.) is coupled to the second axle 128 to selectively rotate the tires 124 of the second forward wheel assembly 106. In this manner, the tires 124 of the first forward wheel assembly 104 are independently operable/moveable relative to the tires 124 of the second forward wheel assembly 106, by way of the respective first and second wheel motors 132, 134, to thereby allow for added control of the vehicle 100 (whereby specific power and operation can be provided to each of the first and second forward wheel assemblies 104, 106, as desired, to help drive, move, direct the vehicle 100, etc.). In one example embodiment, the first and second wheel motors 132, 134 both include hydraulic motors coupled to a hydraulic reservoir (for providing fluid to the motors) (e.g., located behind the engine 110 in FIG. 3, etc.). In connection therewith, in this example, the hydraulic motors are coupled to the reservoir in a generally open loop configuration so that fluid is provided to the motors in a manner that powers the forward wheel assemblies 104, 106 on an on-demand basis (e.g., power goes to whichever wheel assembly needs it the most at the time, etc.).

The location and spacing of the tires 124 of the first and second forward wheel assemblies 104, 106, as described above, may provide a generally wider and more stable stance for the vehicle 100 (at a front of the vehicle 100), as compared to vehicles having forward wheel assemblies with single tires and/or vehicles having single tracks, to resist (or inhibit) tipping when hauling and/or dumping material. The location and spacing of the two tires 124 of each of the first and second forward wheel assemblies 104, 106 may also increase an area of contact between the tires 124 and the ground surface to thereby spread a weight of the vehicle 100 (and material hauled thereby) over a larger surface area, again as compared to vehicles having forward wheel assemblies with single tires and/or vehicles having single tracks, to resist (or inhibit) sinking of the vehicle 100 into the ground surface (or otherwise damaging the ground surface (e.g., cracking it, rutting it, etc.), etc.). That said, in the illustrated embodiment, as an example, a width of the vehicle 100, as defined by a spacing of (or between) outer ones of the tires 124 of the first and second forward wheel assemblies 104, 106 (e.g., as measured generally along the forward axis 120 from an outer portion of the outer tire 124 of the first forward wheel assembly 104 to an outer portion of the outer tire 124 of the second forward wheel assembly 106, etc.), may be between about 35 inches and about 50 inches (e.g., about 45 inches, etc.).

Referring still to FIGS. 1-4, the rearward wheel assembly 108 of the vehicle 100 is located toward a rearward end of the frame 102, adjacent the engine 110, and includes two spaced apart tires (each indicated by reference number 136). A first of the tires 136 is located toward the left side (or first side) of the frame 102 and a second of the tires 136 is located toward the right side (or second side) of the frame 102 (as viewed in FIG. 3). The first and second tires 136 are spaced apart from each other along a rearward axis 138, that is generally perpendicular to the longitudinal axis 122 of the frame 102 (and that is generally parallel to the forward axis 120 of the vehicle 100). In addition in the illustrated embodiment, the first one of the tires 136 (the left tire 136 as viewed in FIG. 3, etc.) is generally aligned with an inner tire 124 of the first forward wheel assembly 104 and the second one of the tires 136 (the right tire 136 as viewed in FIG. 3, etc.) is generally aligned with an inner tire 124 of the second forward wheel assembly 106. In connection therewith, the rearward axis 138 may be spaced apart from the forward axis 120 by a distance of between about 40 inches and about 60 inches. In one particular implementation, the rearward axis 138 may be spaced apart from the forward axis 120 by a distance of between about 45 inches and about 55 inches (e.g., about 50 inches, etc.).

As described for the forward wheel assemblies 104, 106, this positioning/spacing of the tires 136 of the rearward wheel assembly 108, along the rearward axis 138, may provide a generally wider and more stable stance for the vehicle 100, at the rearward end of the frame 102, to further resist (or inhibit) tipping of the vehicle 100 when hauling (e.g., moving, etc.) and/or dumping material (alone or in combination with the location and/or spacing of the tires 124 of the forward wheel assemblies 104, 106). That said, in the illustrated embodiment, a width of the vehicle 100, as defined by a spacing of the tires 136 of the rearward wheel assembly 108 (e.g., as measured generally along the rearward axis 138 from an outer portion of the first one of the tires 136 to an outer portion of the second one of the tires 136, etc.), may be between about 12 inches and about 40 inches. And, in one particular implementation, the width of the vehicle 100, as defined by the first and second tires 136 of the rearward wheel assembly 108, is between about 25 inches and about 36 inches (e.g., about 33 inches, etc.).

The first and second tires 136 of the rearward wheel assembly 108 are controllable by a steering assembly 140 to thereby allow for directing (or steering) a movement of the vehicle 100 (broadly, for controlling directional movement of the vehicle 100). In connection therewith, the tires 136 are connected by a steering linkage 142 (FIG. 4) of the steering assembly 140. And, a handle 144 of the steering assembly 140 is coupled to the steering linkage 142. Together, then, the handle 144 and steering linkage 142 are configured to control movement (e.g., turning, rotating, etc.) of the tires 136 of the rearward wheel assembly 108. In particular, an operator can manipulate (e.g., turn, etc.) the handle 144 of the steering assembly 140 to actuate an arm 146 of the steering linkage 142 (coupled to the handle 144) and thereby move the two tires 136 of the rearward wheel assembly 108 (via a mount 148 coupled to a center link 150 interconnecting the tires 136) to allow for steering the vehicle 100 as the vehicle 100 moves. Such steering of the vehicle 100 may be done alone by the rearward wheel assembly 108 (by way of the steering assembly 140), or it may be in combination with selective operation of the wheel motors 132, 134 of the forward wheel assemblies 104, 106. That said, the tires 136 of the rearward wheel assembly 108 may include any suitable tires (e.g., rubber wheeled tires, etc.) within the scope of the present disclosure.

In the illustrated embodiment, the steering linkage 142 connecting the first and second tires 136 of the rearward wheel assembly 108 includes the center link 150 interconnecting the first and second tires 136, the mount 148 coupled to the center link 150, and the arm 146 coupled between the mount 148 and a base 152 of the handle 144. In connection therewith, as the handle 144 rotates for steering, it correspondingly pushes or pulls on the arm 146. In turn, the arm 146 pushes or pulls on the mount 148, which causes movement of the center link 150. And, the center link 150 then causes the first and second tires 136 to rotate via pivots 154. In this arrangement, the handle 144 is not rigidly/directly coupled to the first and second tires 136, whereby less stress is imposed on the handle 144 during operation of the vehicle 100. It should be appreciated that a different steering linkage 142 and/or steering assembly 140 in general may be used in other embodiments to allow for moving the tires 136 of the rearward wheel assembly 108, for steering the vehicle 100, including, for example, a rack and pinion steering mechanism, etc.

In addition in the illustrated embodiment, the handle 144 of the steering assembly 140 includes left and right grips 156, 158 (as viewed in FIG. 3). Various operations of the vehicle 100 may be controlled at or near the grips 156, 158, such that an operator may control (and operate) the vehicle 100 while holding (and/or while near) the handle 144. For instance, a speed of the vehicle 100 and braking of the vehicle 100 may be controlled by manipulating the right grip 158 (e.g., rotating the grip 158, etc.) and/or an actuator 160 associated with the right grip 158. And, dumping operation of the vehicle 100 may be controlled by manipulating one or more of the actuators (each indicated by reference number 162) mounted on the handle 144 adjacent the right and left grips 156, 158. That said, it should be appreciated that the steering assembly 140 may include handles and/or grips having other configurations and/or arrangements, and/or having other configurations and/or arrangements of controls, actuators, etc. in other embodiments.

Figure 5:
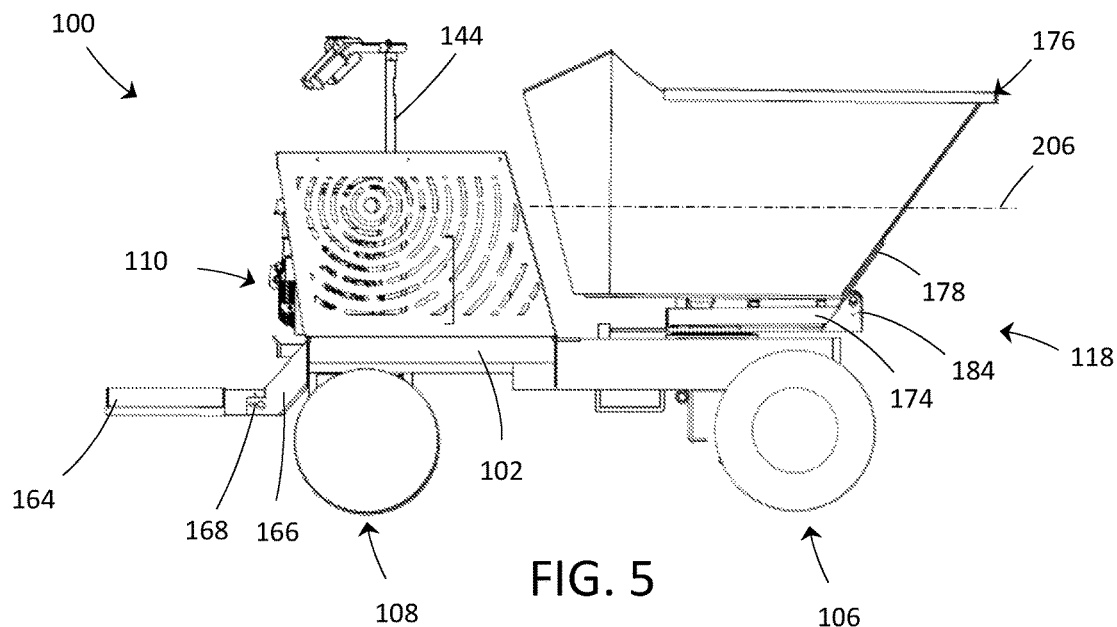
FIG. 5 is a side elevation view of the motorized vehicle of FIG. 1.
Figure 6:
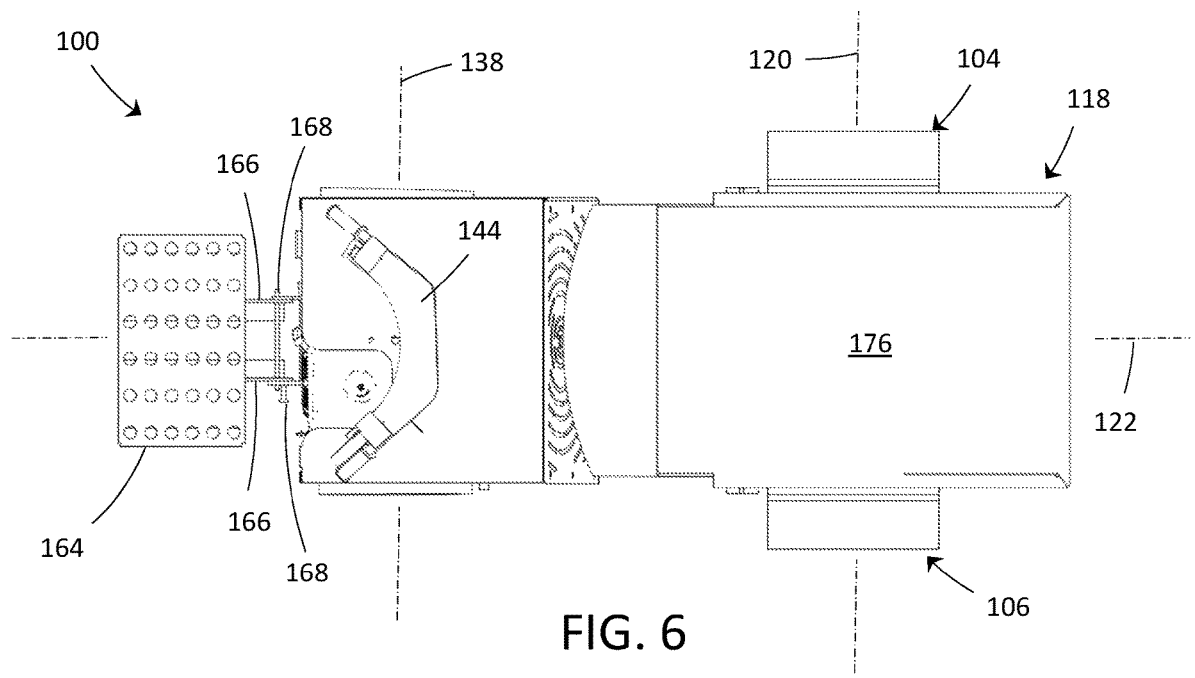
FIG. 6 is a top plan view of the motorized vehicle of FIG. 1.

With reference to FIGS. 5-6, the vehicle 100 also includes an operator stand 164 (or platform) located toward the rearward end of the frame 102. The stand 164 is configured to permit an operator to step (and stand) on the stand 164 and ride on the vehicle 100, for example, while operating the vehicle 100 (e.g., while holding the handle 144, etc.). In the illustrated embodiment, the stand 164 is configured to move between an operating position (FIGS. 5 and 6) for supporting the operator, and a stored position in which the stand 164 is folded generally upwardly and inwardly toward the handle 144 (e.g., for transporting the vehicle 100, for allowing the operator to walk behind the vehicle 100, etc.). In connection therewith, the stand 164 is pivotally mounted to the frame 102 via support arms (each indicated by reference number 166) extending from the frame 102, to allow for the movement of the stand 164 between the operating position and the stored position. Locking pins (each indicated by reference number 168), then, are provided to secure the stand 164 in either the operating position or the stored position (e.g., via alignment of openings in the support arms and/or stand with the locking pins 168, etc.).

Referring now to FIGS. 7-15, the vehicle 100 includes the bucket assembly 118, which is supported by the frame 102 toward the forward end of the frame 102. The bucket assembly 118 is disposed adjacent the forward wheel assemblies 104, 106. In general, the bucket assembly 118 is configured to pivot about a first axis 170 (FIG. 7) of the bucket assembly 118 (e.g., a horizontal axis, etc.) to dump material from the vehicle 100. In addition, the bucket assembly 118 is also configured to rotate about a second axis 172 (FIG. 8) of the bucket assembly 118 (e.g., a vertical axis of the bucket assembly 118 or of the frame 102, etc.) to move the bucket assembly 118 in generally a radial direction about the frame 102 (and relative to the frame 102) to a desired angle. This will be described in more detail next.

Figure 7:
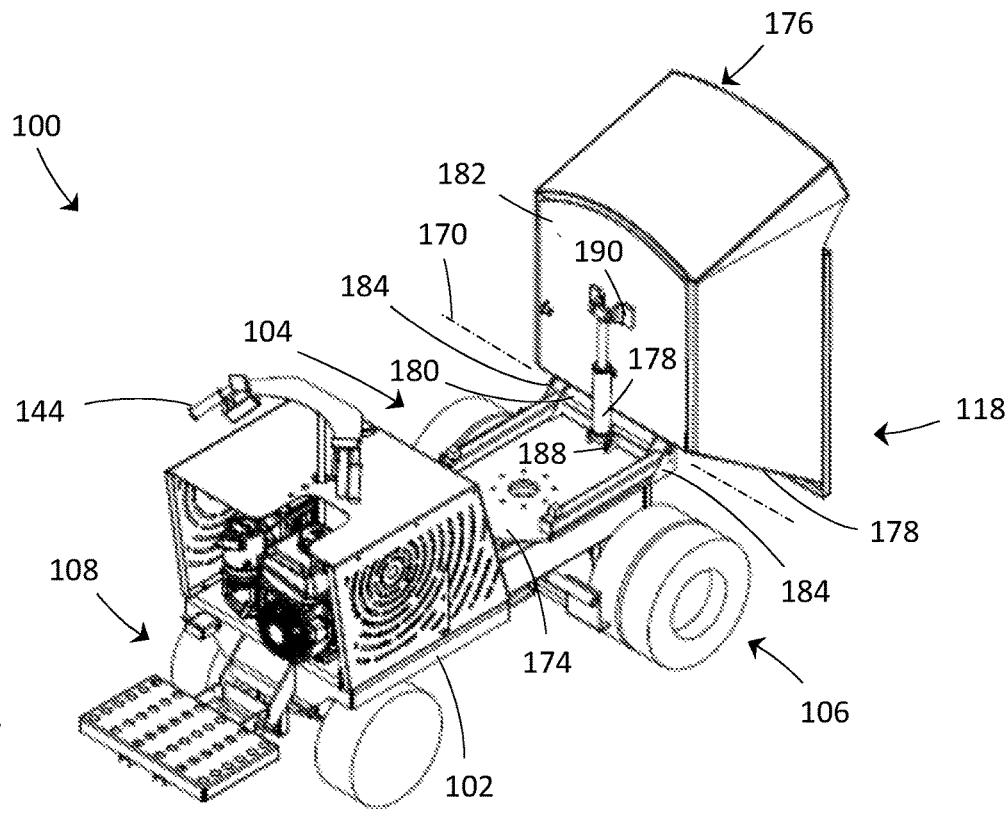
FIG. 7 is an isometric view of the motorized vehicle of FIG. 1, with the bucket shown in a forward dumping position.
Figure 8:
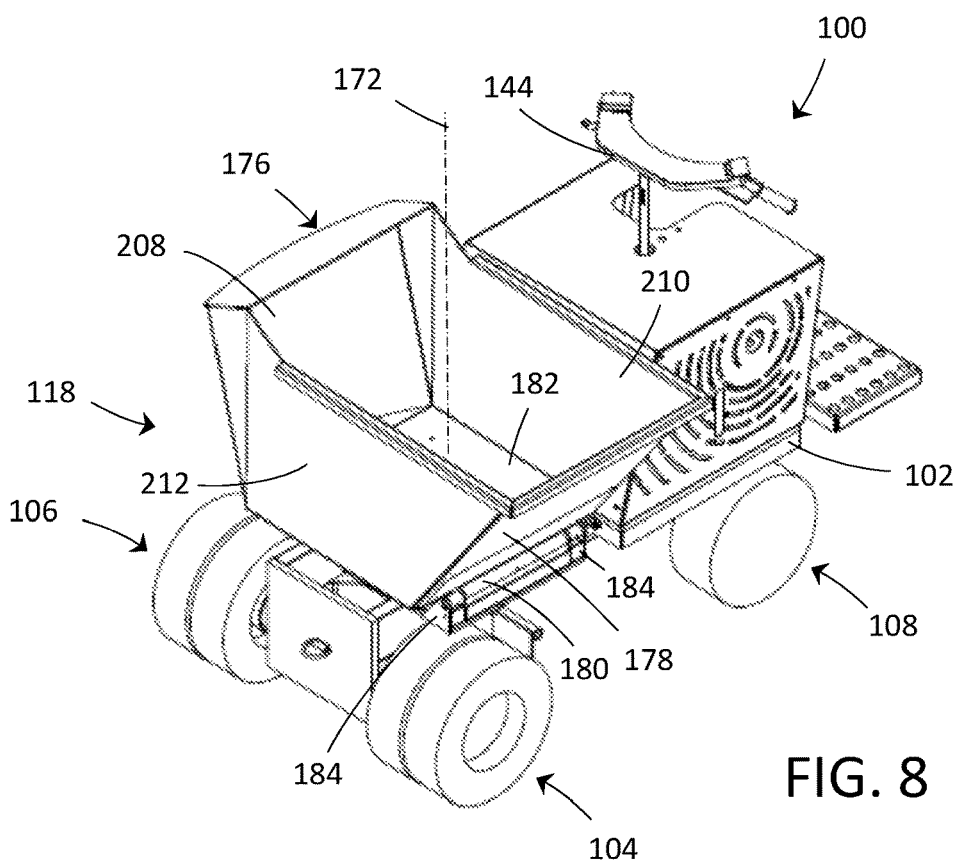
FIG. 8 is an isometric view of the motorized vehicle of FIG. 1, with the bucket shown in a left-side hauling position.

The bucket assembly 118 includes a platform 174 mounted on the frame 102, and a bucket 176 coupled to the platform 174. The bucket 176 is coupled to the platform 174 adjacent a forward wall 178 of the bucket 176 (FIGS. 7 and 8). The bucket 176 includes a pivot 180 (broadly, a mount) (e.g., a bar, a tube, etc.) coupled to the forward wall 178 (generally where the forward wall 178 intersects with a bottom wall 182 of the bucket 176 (e.g., along the horizontal axis 170 of the bucket assembly 118, etc.) and configured to fit within corresponding mounts 184 (e.g., openings, rings, etc.) of the platform 174. And, a hydraulic cylinder 186 or piston (broadly, an actuator) (FIG. 7) is positioned generally between the bucket 176 and the platform 174, with a cylinder portion of the cylinder 186 coupled to a mount 188 of the platform 174 and a rod portion of the cylinder 186 coupled to a bracket 190 of bucket 176. The cylinder 186 is then configured to actuate the bucket 176, by way of a hydraulic pump 192 (e.g., a hydrostatic pump, etc.) (see, FIG. 18), as powered by the engine 110 of the vehicle 100, to cause the bucket 176 to pivot relative to the platform 174 via the pivot 180 (e.g., to rotate, tilt, etc.) and selectively dump material from the bucket 176, etc. In the illustrated embodiment, the bucket 176 is configured to pivot about 90 degrees relative to the platform 174, but may pivot more or less in some implementations (e.g., about 45 degrees, about 100 degrees, etc.).

Figure 16:
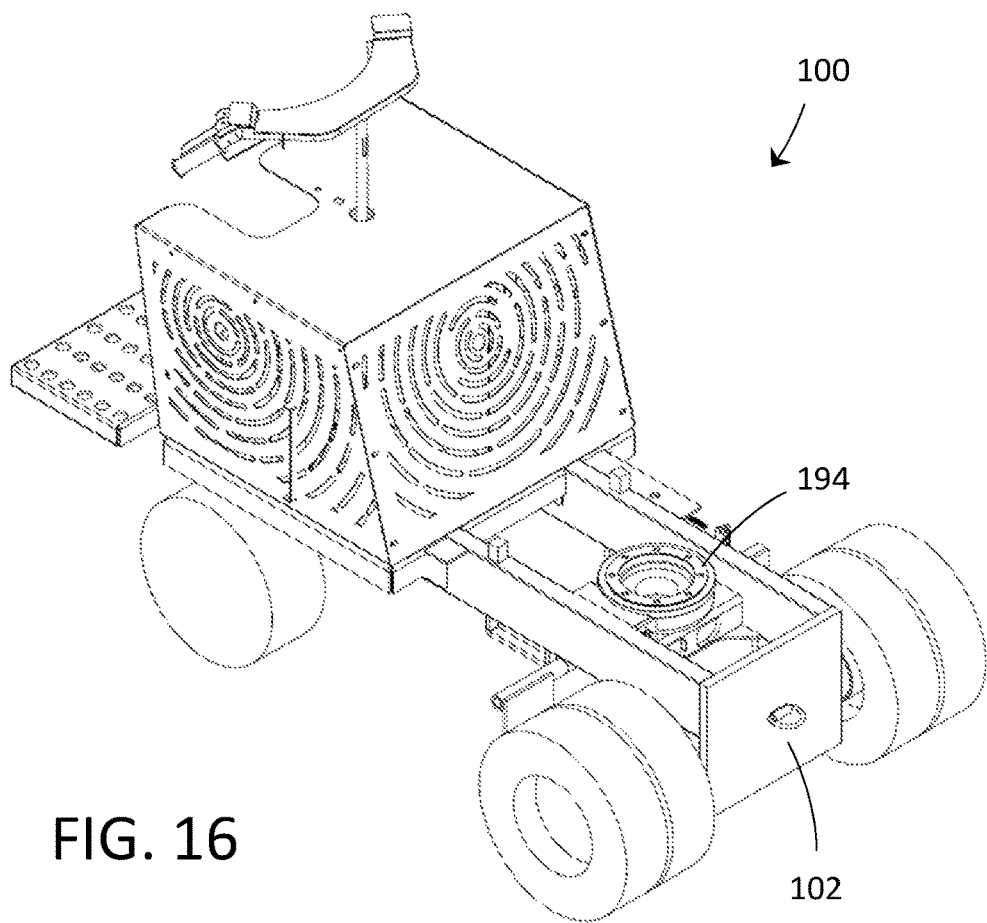
FIG. 16 is a fragmentary isometric view of the motorized vehicle of FIG. 1, with a bucket assembly of the vehicle removed.
Figure 17:
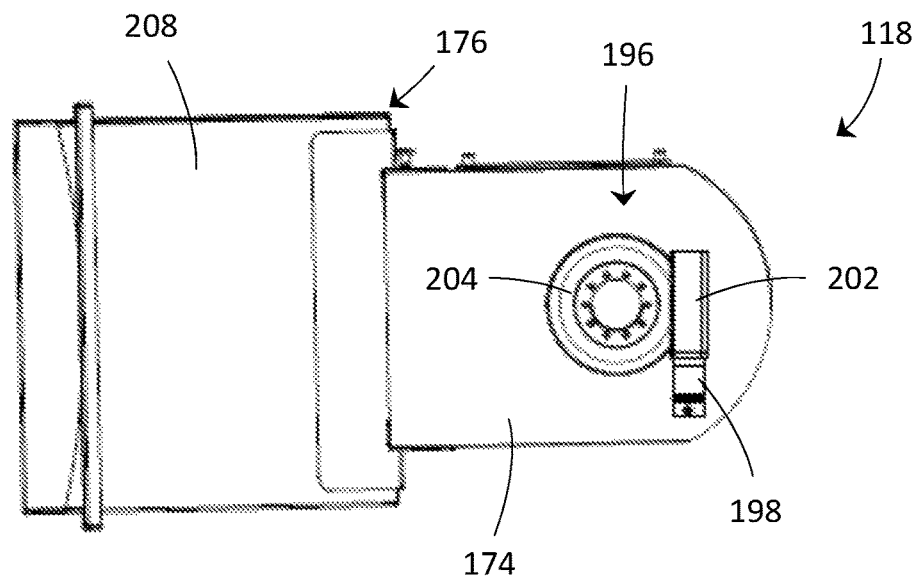
FIG. 17 is a bottom plan view of the bucket assembly of the motorized vehicle of FIG. 1.

With additional reference to FIGS. 16 and 17, the platform 174 of the bucket assembly 118 is mounted on the frame 102 of the vehicle 100 at a bucket mount 194. A drive device 196 (broadly, an actuator) of the platform 174 is positioned at the bucket mount 194 and is configured to rotate the platform 174 (and bucket 176 coupled thereto) relative to the frame 102 (by way of a platform motor 198, as powered by the engine 110) (e.g., between the positions illustrated in FIGS. 2, 8, and 12; etc.). As such, the bucket 176 of the present disclosure is configured to rotate about the vertical axis 172 of the bucket assembly 118 between a plurality of different radial positons (relative to the frame 102 of the vehicle 100). Such rotation may be done while the bucket 176 is in a hauling positon (e.g., FIGS. 8 and 12, etc.) or while the bucket 176 is in a dumping position (e.g., FIGS. 9 and 13, etc.). In this way, the vehicle 100 is able to dump material from the bucket 176 generally straight forward of the vehicle 100 (in a forward dumping position) (FIG. 7), or to a left side of the vehicle 100 (in a left-side dumping position) (e.g., FIGS. 8-11, etc.), or to a right side of the vehicle 100 (in a right-side dumping position) (e.g., FIGS. 12-15, etc.). That said, in the illustrated embodiment the drive device 196 includes a slew ring drive coupled between the bucket mount 194 of the frame 102 and the platform 174 and configured to cause rotation of the platform 174 and bucket 176. In connection therewith, the platform motor 198 is configured to turn a worm shaft 202, which is coupled to a wheel 204 disposed on the platform 174 (and which is configured to fit within the bucket mount 194). As the worm shaft 202 turns, then, it actuates the wheel 204, which correspondingly rotates the platform 174 (and bucket 176). However, in other embodiments, the drive device 196 (or actuator) may include another drive mechanism, for example, a rack and pinion drive, a cylinder (or multi-cylinder) drive, etc. configured to similarly rotate the platform 174 (and bucket 176) relative to the frame 102.

Figure 10:
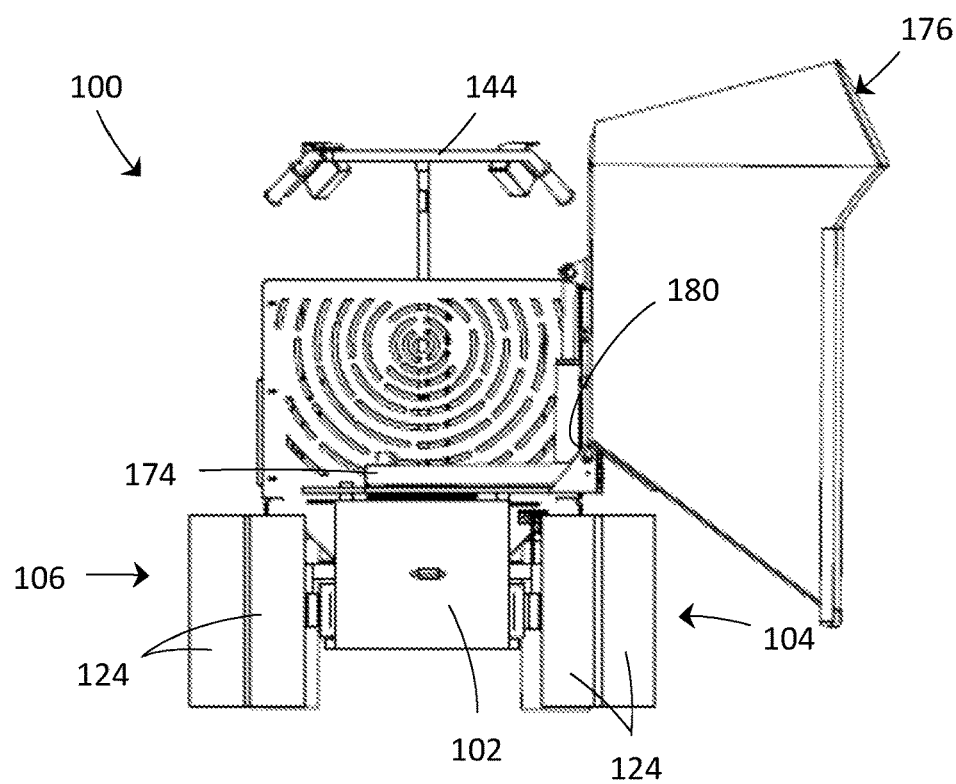
FIG. 10 is a front elevation view of the motorized vehicle of FIG. 9.
Figure 11:
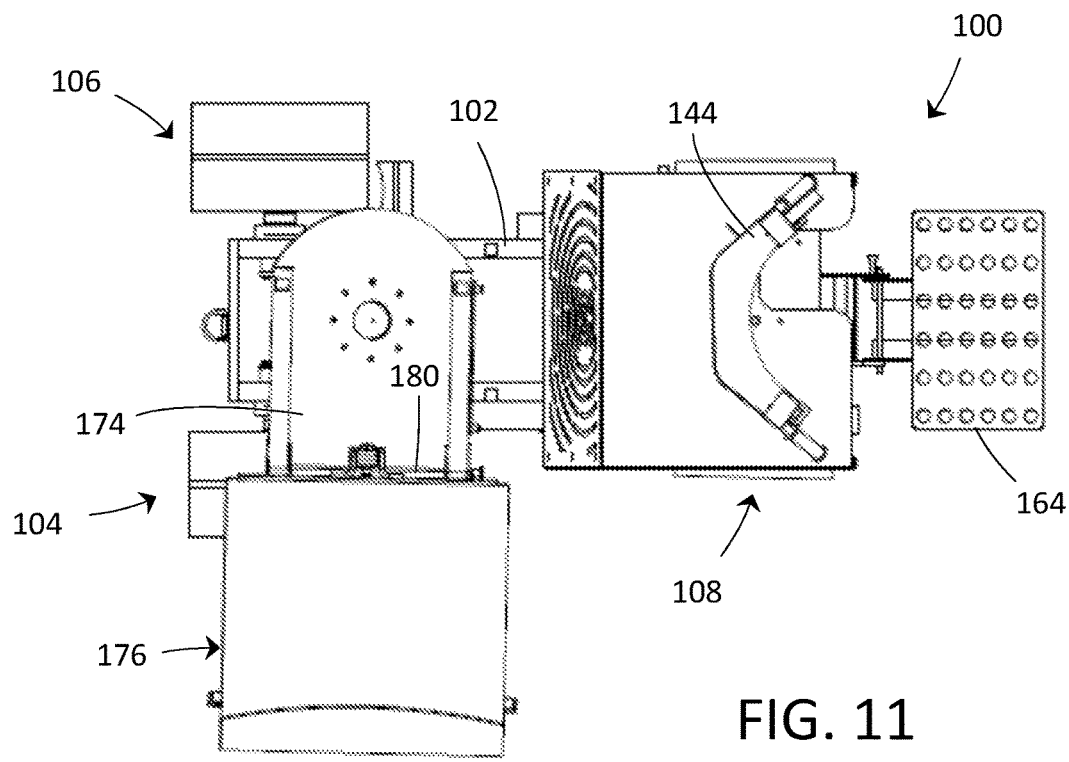
FIG. 11 is a top plan view of the motorized vehicle of FIG. 9.
Figure 12:
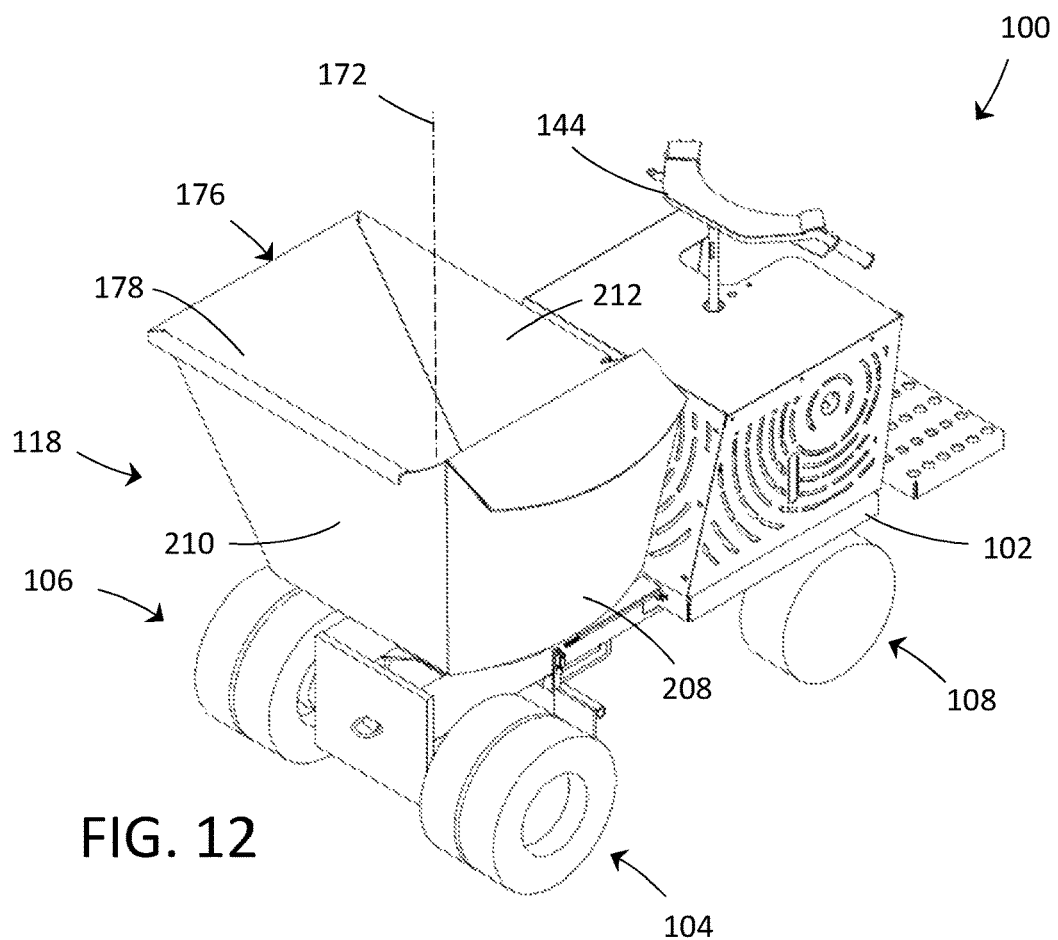
FIG. 12 is an isometric view of the motorized vehicle of FIG. 1, with the bucket shown in a right-side hauling position.
Figure 14:
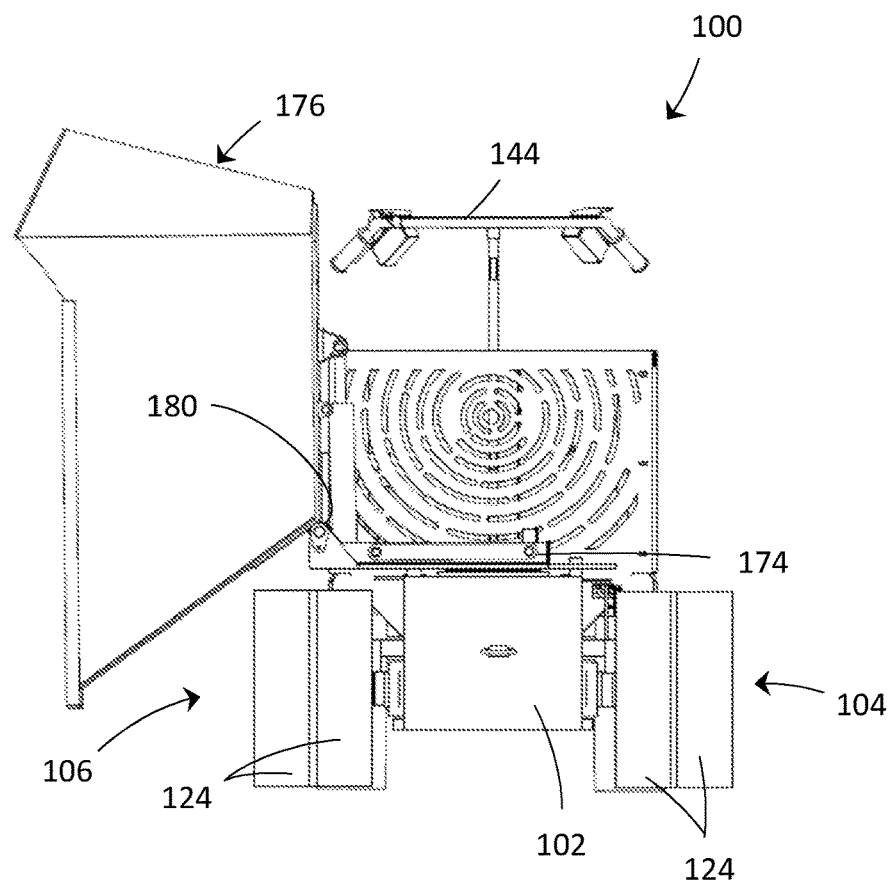
FIG. 14 is a front elevation view of the motorized vehicle of FIG. 13.
Figure 15:
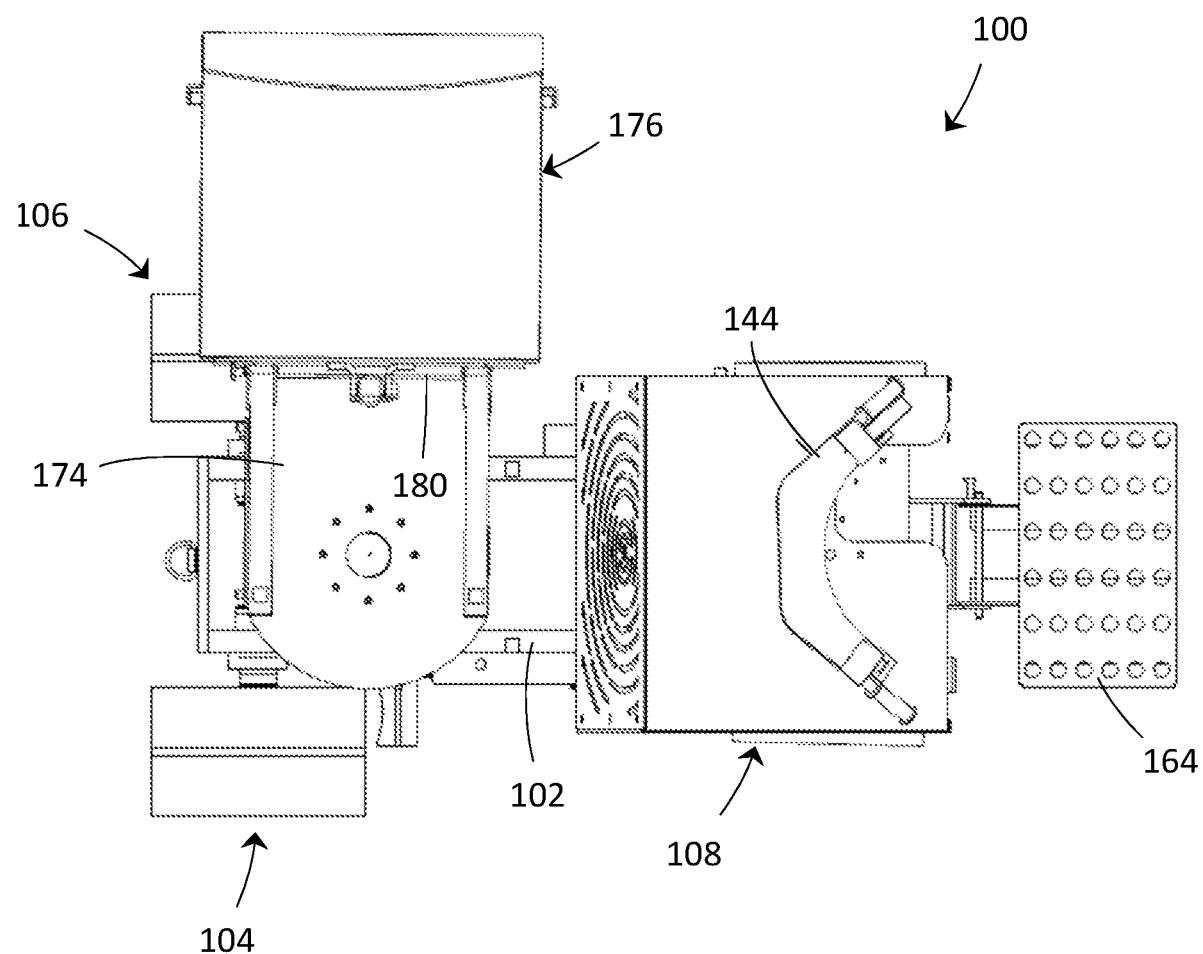
FIG. 15 is a top plan view of the motorized vehicle of FIG. 13.

In the illustrated embodiment, the bucket 176 may be configured to rotate, for example, from a hauling position (e.g., a first radial positon, etc.), in which a longitudinal axis 206 (FIG. 5) of the bucket 176 is generally parallel with the longitudinal axis 122 of the frame 102 of vehicle 100, to a left-side position (e.g., a second radial position, etc.) in which the longitudinal axis 206 of the bucket 176 is generally perpendicular to the longitudinal axis 122 of the frame 102 (e.g., about 90 degrees to the left side of the vehicle 100, etc.) (FIG. 8). Similarly, the bucket 176 may be configured to rotate from the hauling position (e.g., the first radial positon, etc.), in which the longitudinal axis 206 of the bucket 176 is generally parallel with the longitudinal axis 122 of the frame 102 of vehicle 100, to a right-side position (e.g., a third radial position, etc.) in which the longitudinal axis 206 of the bucket 176 is generally perpendicular to the longitudinal axis 122 of the frame 102 (e.g., about 90 degrees to the right side of the vehicle 100, etc.) (FIG. 12). In both of the above examples, when the bucket 176 is in the left-side position or the right-side position, at least part of the pivot 180 is positioned over at least one of the tires 124 of the first forward wheel assembly 104 or over at least one of the tires 124 of the second forward wheel assembly 106 (FIGS. 10 and 14). That said, it should be appreciated that the bucket 176 may also be configured to rotate to multiple other different radial positons (e.g., about 110 degrees to the lift side of the frame 102, about 45 degrees to the left side of the frame 102, about 45 degrees to the right side of the frame 102, about 110 degrees to the right side of the frame 102, etc.) in other examples. In addition, in some embodiments, the bucket 176 (and/or platform 174) may be moveable in a generally vertical direction relative to the vehicle 100 (e.g., in a direction generally parallel to the vertical axis 172 of the bucket 176, etc.).

The bucket 176 of the bucket assembly 118 is configured to hold material being hauled by the vehicle 100, and to subsequently dump the material as desired (e.g., straight forward of the vehicle 100, to a side of the vehicle 100, etc.). In addition, the bucket 176 may be constructed from suitable material (e.g., plastics, metals, combinations thereof, etc.) and may have any suitable and/or desired capacity. For instance, in some embodiments, the bucket 176 may be constructed from a plastic material and may have a capacity of at least about 10 cubic feet (e.g., about 10 cubic feet, about 15 cubic feet, about 16 cubic feet, about 21 cubic feet, etc.), and a payload of at least about 1000 pounds (e.g., about 1000 pounds, about 1500 pounds, about 2000 pounds, about 2500 pounds, about 3000 pounds, etc.). Further in the illustrated embodiment, the bucket 176 defines a generally rectangular shape. In connection therewith, the bucket 176 includes the bottom wall 182 (or floor), the forward wall 178 (coupled to the bottom wall), a rearward wall 208 adjacent the engine 110 (and coupled to the bottom wall 182), and opposing side walls 210, 212 (each coupled to the bottom wall) (FIG. 8). The forward wall 178 is generally lower than the rearward wall 208 and is angled (or sloped) relative to the bottom wall 182 to facilitate dumping material from the bucket 176. The side walls 210, 212 are generally vertical and have a similar height to the forward wall 178. And, the rearward wall 208 is sloped and is relatively higher than the forward wall 178 so as to increase carrying capacity of the bucket. It should be appreciated that the walls 178, 182, 208, 210, 212 of the bucket 176, and more generally the bucket 176 itself, may have different configurations in other embodiments.

FIG. 18 schematically illustrates the vehicle 100, and a configuration of the engine 110 of the vehicle 100 as mounted on the frame 102. As shown, and as described above, the engine 110 is generally located between the forward wheel assemblies 104, 106 and the rearward wheel assembly 108 (and generally closer to the rearward wheel assembly 108). And, the engine 110 is configured to provide power to the different parts and/or components of the vehicle 100 to move the vehicle 100 and operate the bucket assembly 118.

For instance, the engine 110 is coupled (as indicated by the dashed lines in FIG. 18) to the first and second wheel motors 132, 134, to thereby selectively power the wheel motors 132, 134 (via the grip(s) 156, 158 of the handle 144 of the steering assembly 140 (FIG. 3)) to rotate the tires 124 of the first and second forward wheel assemblies 104, 106 to move the vehicle 100 forward or backward. In addition, the tires 124 of the first and second forward wheel assemblies 104, 106 are independently operable/moveable, by way of the respective first and second wheel motors 132, 134, to thereby allow for added control of the vehicle 100 (whereby specific power and operation can be provided to each of the first and second wheel assemblies 104, 106, as desired, to help direct the vehicle 100, etc.).

Figure 9:
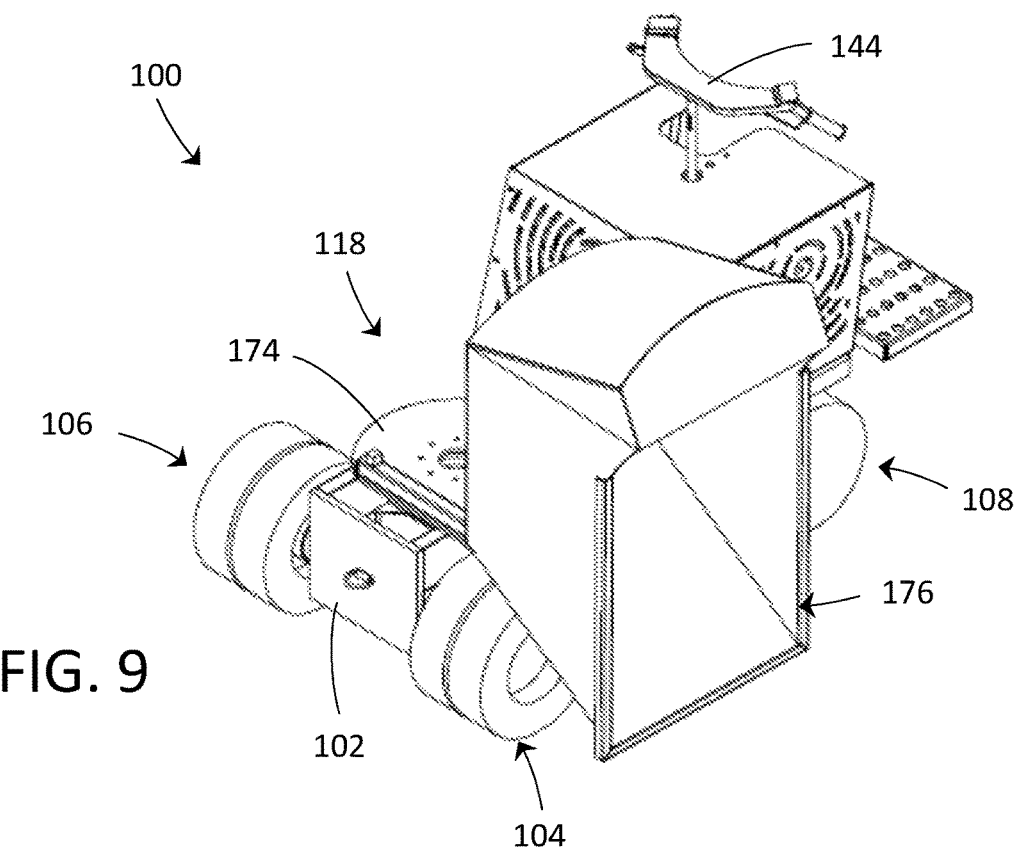
FIG. 9 is the isometric view of the motorized vehicle of FIG. 8, with the bucket shown in a left-side dumping position.
Figure 13:
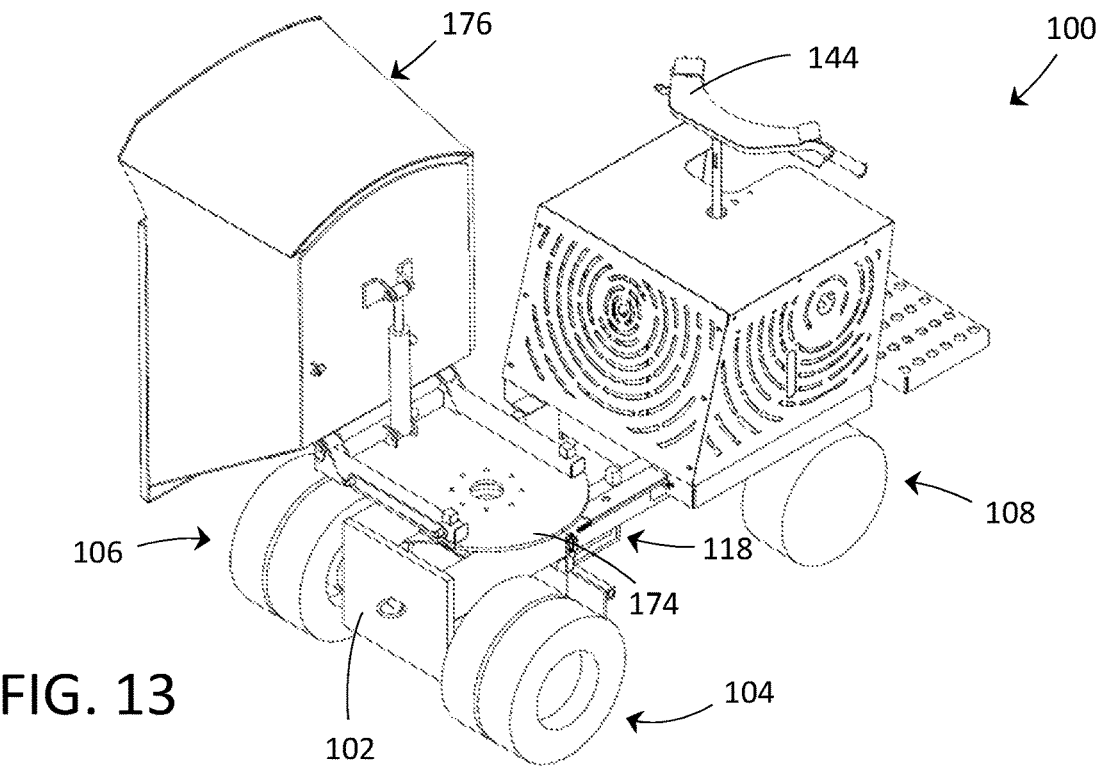
FIG. 13 is the isometric view of the motorized vehicle of FIG. 12, with the bucket shown in a right-side dumping position.

In addition, the engine 110 is coupled (as also indicated by the dashed lines in FIG. 18) to the platform motor 198 of the bucket assembly 118 to thereby power the motor 198 to selectively operate the drive device 196 to rotate the platform 174 (and bucket 176 coupled thereto), relative to the frame 102. In connection therewith, the vehicle 100 is able to dump material from the bucket 176 generally straight forward (or straight ahead) of the vehicle 100, or to a left side of the vehicle 100 or a right side of the vehicle 100. Further, the engine 110 is also coupled (as indicated by the dashed lines in FIG. 18) to the hydraulic pump 192 associated with the cylinder 186 of the bucket assembly 118 to thereby cause the bucket 176 to pivot relative to the platform 174 to dump material from the bucket 176. This may be done while the bucket 176 is in a hauling position (FIGS. 2, 8, and 12) or in a dumping position (FIGS. 7, 9, and 13).

The foregoing description of the embodiments has been provided for purposes of illustration and description. It is not intended to be exhaustive or to limit the present disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the present disclosure, and all such modifications are intended to be included within the scope of the present disclosure.

Example embodiments have been provided so that this disclosure will be thorough, and will fully convey the scope to those who are skilled in the art. Numerous specific details are set forth such as examples of specific components, assemblies, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific material(s), and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, components, and/or groups thereof, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" and the phrase "at least one of" includes any and all combinations of one or more of the associated listed items.

Although the terms first, second, third, etc. may be used herein to describe various elements, components, seeds, members and/or sections, these elements, components, seeds, members and/or sections should not be limited by these terms. These terms may be only used to distinguish one element, component, seed, member or section from another element, component, seed, member or section. Terms such as "first," "second," and other numerical terms when used herein do not imply a sequence or order unless clearly indicated by the context. Thus, a first element, component, seed, member or section discussed below could be termed a second element, component, seed, member or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A motorized vehicle for transporting material, the motorized vehicle comprising:

a frame having a longitudinal axis;

first and second forward wheel assemblies, the first forward wheel assembly including at least one tire disposed toward a first side of the frame and the second forward wheel assembly including at least one tire disposed toward a second side of the frame, the at least one tire of the first forward wheel assembly spaced apart from the at least one tire of the second forward wheel assembly along a forward axis, the forward axis disposed generally perpendicular to the longitudinal axis of the frame;

a rearward wheel assembly including a first tire disposed toward the first side portion of the frame and a second tire disposed toward the second side portion of the frame, the first tire of the rearward wheel assembly spaced apart from the second tire of the rearward wheel assembly along a rearward axis, the rearward axis disposed generally perpendicular to the longitudinal axis of the frame;

an engine supported by the frame and configured to rotate the at least one tire of the first forward wheel assembly and the at least one tire of the second forward wheel assembly to thereby move the motorized vehicle; and a bucket assembly supported by the frame and configured to hold material on the motorized vehicle and selectively dump the material from the motorized vehicle, the bucket assembly disposed adjacent the first and second forward wheel assemblies, the bucket assembly including a bucket configured to pivot about a horizontal axis of the bucket assembly to dump the material from the motorized vehicle, and the bucket assembly further including a platform configured to rotate about a vertical axis of the bucket assembly to move the bucket in a radial direction relative to the frame.

2. The motorized vehicle of claim 1, further comprising a steering assembly configured to move the first and second tires of the rearward wheel assembly for steering the motorized vehicle.

3. The motorized vehicle of claim 2, wherein the first forward wheel assembly includes two tires, and wherein the second forward wheel assembly includes two tires.

4. The motorized vehicle of claim 3, wherein the two tires of the first forward wheel assembly are mounted on a first axle, and wherein the two tires of the second forward wheel assembly are mounted on a second axle separate from the first axle.

5. The motorized vehicle of claim 1, wherein an outer portion of the at least one tire of the first forward wheel assembly is spaced apart from an outer portion of the at least one tire of the second forward wheel assembly, along the forward axis, by a distance of between about 35 inches and about 50 inches.

6. The motorized vehicle of claim 1, wherein an outer portion of the first tire of the rearward wheel assembly is spaced apart from an outer portion of the second tire of the rearward wheel assembly, along the rearward axis, by a distance of between about 25 inches and about 36 inches.

7. The motorized vehicle of claim 1, wherein the forward axis is spaced apart from the rearward axis by a distance of between about 45 inches and about 55 inches.

8. The motorized vehicle of claim 1, wherein the bucket assembly further includes:
a first actuator configured to pivot the bucket about the horizontal axis of the bucket assembly; and
a second actuator configured to rotate the platform about the vertical axis of the bucket assembly and move the bucket relative to the frame.

9. The motorized vehicle of claim 8, wherein the first actuator includes a piston coupled to the platform and to the bucket to thereby rotate the bucket about the horizontal axis of the bucket assembly.

10. The motorized vehicle of claim 8, wherein the second actuator is selected from a slew ring, a rack and pinion drive, and/or a cylinder drive.

11. The motorized vehicle of claim 1, wherein the bucket assembly includes a mount configured to pivotally couple the bucket to the platform, the mount extending along the horizontal axis of the bucket assembly; and
wherein the bucket includes a bottom wall and a forward wall arranged at an angle relative to the bottom wall, the mount disposed adjacent an intersection of the bottom wall and the forward wall of the bucket.

12. A motorized vehicle for transporting material, the motorized vehicle comprising:
a frame having a longitudinal axis;
first and second forward wheel assemblies coupled to the frame, the first forward wheel assembly disposed toward a first side of the frame and the second forward wheel assembly disposed toward a second side of the frame;
a rearward wheel assembly coupled to the frame;
an engine supported by the frame and configured to rotate the first and second forward wheel assemblies to thereby move the motorized vehicle; and
a bucket supported by the frame adjacent the first and second forward wheel assemblies, the bucket configured to hold material on the motorized vehicle and selectively dump the material from the motorized vehicle, the bucket configured to rotate about a vertical axis at least between a first radial positon in which a longitudinal axis of the bucket is generally parallel with the longitudinal axis of the frame and a second radial positon in which the longitude axis of the bucket is oriented generally perpendicular to the longitudinal axis of the frame.

13. The motorized vehicle of claim 12, further comprising a platform coupled to the frame and configured to rotate about a vertical axis to rotate the bucket at least between the first radial positon and the second radial positon;
wherein the bucket includes a mount configured to pivotally couple the bucket to the platform to thereby allow the bucket to pivot relative to the platform to dump the material from the motorized vehicle, and wherein at least part of the mount is positioned over either the first forward wheel assembly or the second forward wheel assembly when the bucket is in the second radial position.

14. The motorized vehicle of claim 13, wherein the first forward wheel assembly includes two tires, and wherein the second forward wheel assembly includes two tires;
wherein at least part of the mount is positioned over at least one of the two tires of the first forward wheel assembly or over at least one of the two tires of the second forward wheel assembly when the bucket is in the second position.

15. The motorized vehicle of claim 12, wherein the first forward wheel assembly includes at least one tire, and wherein the second forward wheel assembly includes at least one tire; and
wherein the rearward wheel assembly includes a first tire and a second tire, the first tire generally aligned with the at least one tire of the first forward wheel assembly and the second tire generally aligned with the at least one tire of the second forward wheel assembly.

16. A method of using a motorized vehicle to transport material between locations and to dump the material at one or more of the locations, the method comprising:
actuating, by an engine of the motorized vehicle, first and second forward wheel assemblies to move the motorized vehicle, via tires of the first and second forward wheel assemblies, from a first location to a second location; and
at the second location:
rotating, by a first actuator powered by the engine, a bucket of the motorized vehicle in a radial direction of a frame of the motorized vehicle from a first radial positon, in which a longitudinal axis of the bucket is generally parallel with a longitudinal axis of the frame of the motorized vehicle, to a second radial positon, in which the longitude axis of the bucket is oriented perpendicular to the longitudinal axis of the frame; and
pivoting, by a second actuator powered by the engine, the bucket about a mount extending along a wall of the bucket to dump the material from the motorized vehicle toward a side of the motorized vehicle.

17. The method of claim 16, wherein rotating the bucket from the first radial positon to the second radial positon includes positioning the mount over at least part of at least one of the tires of the first forward wheel assembly and/or second forward wheel assembly.

18. The method of claim 16, further comprising further comprising actuating a rearward wheel assembly of the motorized vehicle to control a direction of movement of the motorized vehicle.

* * * * *